(12) United States Patent
Sadler et al.

(10) Patent No.: US 11,732,676 B1
(45) Date of Patent: Aug. 22, 2023

(54) ROCKET MOTOR WITH EMBEDDED BURNABLE CUTTING EXPLOSIVE ENERGETIC MATERIAL

(71) Applicant: Raytheon Company, Waltham, MA (US)

(72) Inventors: Coulton T. Sadler, Tucson, AZ (US); Mitchell Lee Moffet, Tucson, AZ (US); Erik C. Rupp, Tucson, AZ (US); Reuben E. Weinzinger, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 17/711,409

(22) Filed: Apr. 1, 2022

(51) Int. Cl.
*F02K 9/38* (2006.01)
*F42B 1/028* (2006.01)
*F02K 9/34* (2006.01)

(52) U.S. Cl.
CPC ............. *F02K 9/38* (2013.01); *F02K 9/346* (2013.01); *F42B 1/028* (2013.01)

(58) Field of Classification Search
CPC ... F02K 9/34; F02K 9/38; F02K 9/346; F42B 1/00; F42B 1/028; F42B 39/14; F42B 39/20; F42B 1/02; F42B 1/032; F42B 15/38
USPC .......................... 102/307, 377, 378
See application file for complete search history.

(56) References Cited

U.S. PATENT DOCUMENTS

| | | | |
|---|---|---|---|
| 2,988,877 A | | 6/1961 | Shope |
| 3,212,256 A | * | 10/1965 | Sampson ............... F02K 9/346 60/39.47 |
| 3,266,240 A | | 8/1966 | Kurylko et al. |
| 4,041,869 A | * | 8/1977 | San Miguel ........... F02K 9/346 102/481 |
| 4,442,666 A | * | 4/1984 | Vetter .................... F42B 39/20 60/39.47 |
| 4,470,562 A | | 9/1984 | Hall et al. |
| 4,956,971 A | | 9/1990 | Smith |
| 5,070,691 A | | 12/1991 | Smith et al. |
| 5,129,326 A | * | 7/1992 | Brogan ................... F42B 39/20 149/37 |
| 5,206,455 A | | 4/1993 | Williams et al. |
| 5,206,989 A | | 5/1993 | Smith et al. |

(Continued)

FOREIGN PATENT DOCUMENTS

WO 2003/058049 7/2003

*Primary Examiner* — Steven M Sutherland
(74) *Attorney, Agent, or Firm* — Renner, Otto, Boisselle & Sklar, LLP

(57) ABSTRACT

A rocket motor has an energetic material between solid fuel (propellant) and a casing that surrounds the solid fuel. The energetic material is configured to be burned along with the solid fuel during normal operation of the rocket motor to produce thrust. The energetic material can also be detonated to cause rupture of the casing. The detonation may be initiated as part of a flight termination process. The detonation may also be initiated as a part of process to prevent as a higher-order reaction, such as in reaction to heating from a fire or other cause. The energetic material may be arranged to function as part of a shaped charge, able to split the casing when detonated. By being located inside the casing, the energetic material does not adversely affect aerodynamics of the flight vehicle of which the rocket motor is a part, such as a missile.

20 Claims, 6 Drawing Sheets

(56) References Cited

U.S. PATENT DOCUMENTS

| | | | |
|---|---|---|---|
| 5,228,285 A * | 7/1993 | Van Name | F42B 39/20 |
| | | | 60/253 |
| 5,419,118 A | 5/1995 | McSpadden et al. | |
| 5,456,425 A | 10/1995 | Morris et al. | |
| 5,491,973 A | 2/1996 | Knapp et al. | |
| 5,507,231 A | 4/1996 | Moore et al. | |
| 6,148,729 A | 11/2000 | Smith et al. | |
| 6,363,855 B1 | 4/2002 | Kim et al. | |
| 6,952,995 B2 | 10/2005 | Friedlander, III | |
| 7,012,233 B2 | 3/2006 | Brown et al. | |
| 7,373,885 B2 * | 5/2008 | Skinner | F42B 39/14 |
| | | | 60/223 |
| 8,104,719 B2 | 1/2012 | Shiau et al. | |
| 8,256,716 B2 | 9/2012 | Dietrich et al. | |
| 8,291,691 B2 | 10/2012 | Spear et al. | |
| 9,261,048 B2 | 2/2016 | Suzuki et al. | |
| 9,329,011 B1 | 5/2016 | Smith | |
| 9,702,320 B2 | 7/2017 | Mihara et al. | |
| 9,784,545 B1 | 10/2017 | Graham et al. | |
| 9,988,889 B2 | 6/2018 | Carlson et al. | |
| 10,006,408 B2 | 6/2018 | Mihara et al. | |
| 10,001,085 B2 | 7/2018 | Isaac et al. | |
| 10,113,846 B2 | 10/2018 | Pitre et al. | |
| 10,197,611 B2 | 2/2019 | Biggs | |
| 10,247,139 B2 | 4/2019 | Suzuki et al. | |
| 10,634,093 B2 | 4/2020 | Krishnan | |
| 10,801,822 B2 | 10/2020 | Wilson et al. | |
| 2007/0113537 A1 | 5/2007 | Chang et al. | |
| 2007/0240600 A1 | 10/2007 | Skinner et al. | |
| 2010/0043661 A1 | 2/2010 | Graham | |
| 2011/0044741 A1 | 2/2011 | Diehl et al. | |
| 2021/0381468 A1 | 12/2021 | Lefcourt et al. | |

* cited by examiner

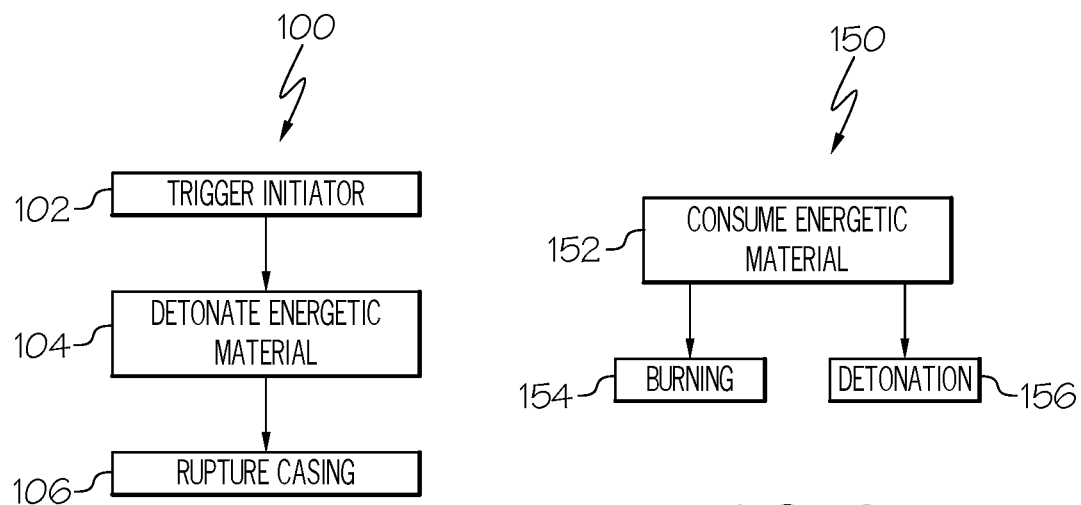
FIG. 11
FIG. 12
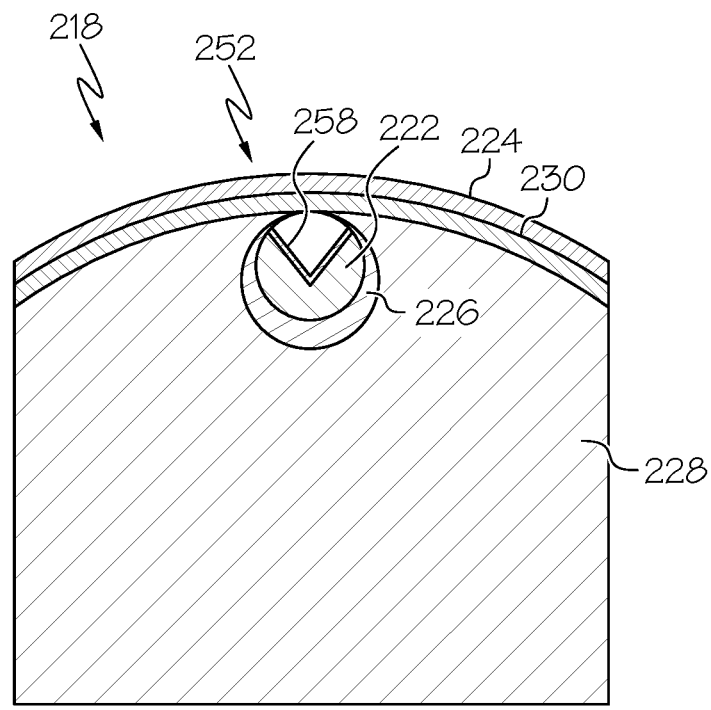
FIG. 13

ROCKET MOTOR WITH EMBEDDED BURNABLE CUTTING EXPLOSIVE ENERGETIC MATERIAL

FIELD

The present disclosure is in the field of devices and methods for propulsion using rocket motors.

BACKGROUND

Insensitive munitions and range safety requirements necessitate devices capable of splitting the rocket motor of a missile, either to terminate flight or to prevent a high order reaction. Such devices have usually been placed on the outside of the missile body, increasing aerodynamic drag and potentially limiting the size of the rocket motor and the range of the system.

SUMMARY

A rocket motor includes an energetic material and a propellant inside a casing, with the energetic material burnable along with the propellant to produce thrust, and also capable of being used to rupture the casing to prevent operation of the rocket motor and/or cause flight termination of a flight vehicle (such as a missile) of which the rocket motor is a part.

According to an aspect of the disclosure, a rocket motor includes: a casing; a solid propellant; and an energetic material between the solid propellant and the casing; wherein the energetic material is configured to burn along with the propellant to produce thrust in the rocket motor; and wherein the energetic material is configured to be capable of detonation to rupture the casing.

According to an embodiment of any paragraph(s) of this summary, the energetic material is part of a linear shaped charge.

According to an embodiment of any paragraph(s) of this summary, the linear shaped charge includes a charge liner on a surface of the energetic material.

According to an embodiment of any paragraph(s) of this summary, the charge liner is on a surface of a void in the energetic material.

According to an embodiment of any paragraph(s) of this summary, the charge liner faces radially outward toward the casing.

According to an embodiment of any paragraph(s) of this summary, the void is a wedge-shaped void.

According to an embodiment of any paragraph(s) of this summary, the energetic material includes hexanitrostilbene (HNS) or a polymer-based explosive such as PBXN-5.

According to an embodiment of any paragraph(s) of this summary, the rocket motor further includes a casing liner between the casing, and the solid fuel and the energetic material.

According to an embodiment of any paragraph(s) of this summary, the energetic material is in contact with the solid propellant.

According to an embodiment of any paragraph(s) of this summary, the rocket motor further includes an insulative material between the solid propellant and the energetic material.

According to an embodiment of any paragraph(s) of this summary, the insulative material is a burnable material.

According to an embodiment of any paragraph(s) of this summary, the insulative material acts a barrier to prevent ignition of the propellant from the energetic material.

According to an embodiment of any paragraph(s) of this summary, the rocket motor further includes an initiator that is operatively coupled to the energetic material to detonate the energetic material.

According to an embodiment of any paragraph(s) of this summary, the initiator is separated from the energetic material by a bulkhead that is part of the casing.

According to an embodiment of any paragraph(s) of this summary, the initiator is configured to trigger detonation of the energetic material upon occurrence of one or more circumstances.

According to an embodiment of any paragraph(s) of this summary, the one or more circumstances includes a temperature-related circumstance.

According to an embodiment of any paragraph(s) of this summary, the one or more circumstances includes a flight-related circumstance.

According to an embodiment of any paragraph(s) of this summary, the initiator is actively triggerable by a remote operator.

According to an embodiment of any paragraph(s) of this summary, the rocket motor is part of a missile.

According to another aspect of the disclosure, a missile includes: a rocket motor that includes: a casing; and a solid propellant; and an energetic material inside the casing; wherein the energetic material burns along with the solid propellant during normal operation of the rocket motor; and wherein the energetic material is part of a linear shaped charge capable of rupturing the casing.

According to yet another aspect of the disclosure, a method of operating a rocket motor includes the steps of: consuming an energetic material in a first mode or a second mode; wherein in the first mode the energetic material is burned along with propellant of the rocket motor to produce thrust; and wherein in the second mode the energetic material is detonated to rupture a casing of the rocket motor that encloses the propellant and the energetic material.

While a number of features are described herein with respect to embodiments of the disclosure; features described with respect to a given embodiment also may be employed in connection with other embodiments. The following description and the annexed drawings set forth certain illustrative embodiments of the disclosure. These embodiments are indicative, however, of but a few of the various ways in which the principles of the disclosure may be employed. Other objects, advantages, and novel features according to aspects of the disclosure will become apparent from the following detailed description when considered in conjunction with the drawings.

BRIEF DESCRIPTION OF THE DRAWINGS

The annexed drawings, which are not necessarily to scale, show various aspects of the disclosure.

FIG. 11 is a high-level flow chart of a method according to an embodiment of the disclosure.

FIG. 12 is a high-level flow chart of a method according to another embodiment of the disclosure.

FIG. 13 is an end sectional view of a portion of a rocket motor, according to an alternate embodiment of the disclosure.

DETAILED DESCRIPTION

A rocket motor has an energetic material between solid fuel (propellant) and a casing that surrounds the solid fuel. The energetic material is configured to be burned along with the solid fuel during normal operation of the rocket motor to produce thrust. The energetic material can also be detonated to cause rupture of the casing. The detonation may be initiated as part of a flight termination process. The detonation may also be initiated as a part of process to prevent as a higher-order reaction, such as in reaction to heating from a fire or other cause. The energetic material may be arranged to function as part of a shaped charge, able to split the casing when detonated. By being located inside the casing, the energetic material does not adversely affect aerodynamics of the flight vehicle of which the rocket motor is a part, such as a missile. And by being burnable along with the solid fuel to produce thrust from the rocket vehicle, the energetic material contributes to efficiency in normal operation of the rocket motor.

Figure 1:
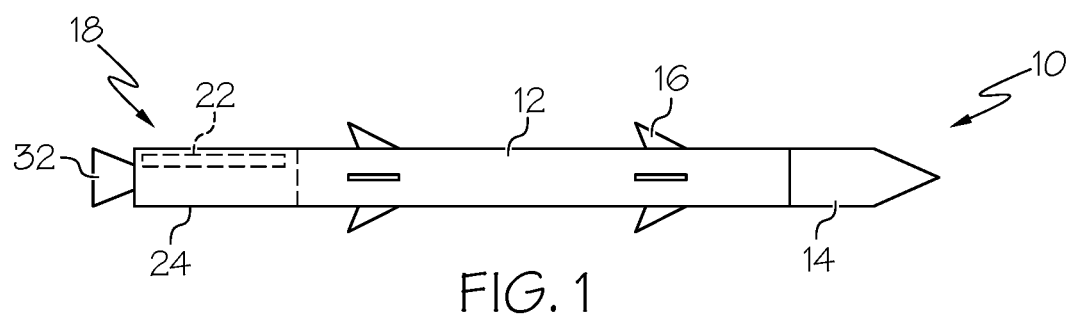
FIG. 1 is side view of a missile that includes a rocket motor, according to an embodiment of the disclosure.
Figure 2:
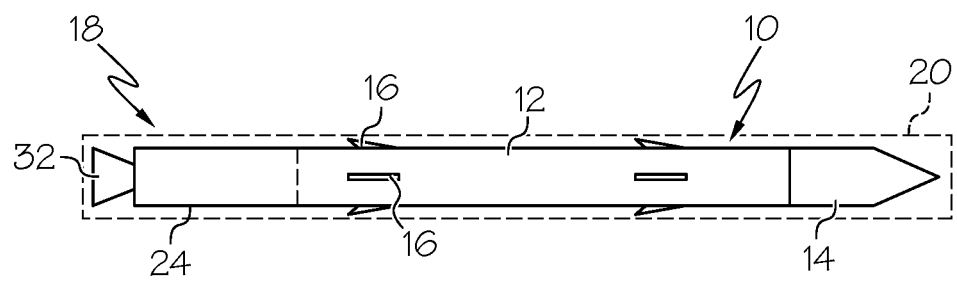
FIG. 2 is a side view showing the missile of FIG. 1 in a container.

FIGS. 1 and 2 shows a missile 10 that includes a fuselage 12, a payload 14 (such as a warhead), control surfaces 16 (for example fins and/or canards), and a rocket motor 18 to provide thrust for flight. As shown in FIG. 2, the missile 10 may be contained within a canister 20 during transport and storage.

As described further below, the rocket motor 18 is configured with an energetic material 22 that is able to split a casing 24 of the rocket motor 18, in order to render the rocket motor 18 inoperative to produce thrust. This may be done during flight to terminate flight, by initiating detonation of energetic material with a detonator or initiator. Alternatively this may be as a safety measure, to rupture the casing 24 when the missile 10 reaches a predetermined temperature or range of temperatures, to render the rocket motor 18 inoperative when exposed to fire or other heating during transportation or storage (or otherwise when not in flight).

Alternatively, the energetic material 22 may be burned as part of or along with the fuel (propellant) of the rocket motor 18, to produce thrust. Some of the energetic material 22 may be burned (along with propellant) to produce thrust, before a remainder of the energetic material 22 is detonated to rupture or split the casing 24.

Although the operation is described below in the context of the missile 10, it will be appreciated that principles described below may be usable other contexts. For example the principles may be used in rocket motors in other sorts of flight vehicles and/or munitions. For example the rocket motor as described in the various embodiments herein may be part of a spacecraft or a commercial rocket.

Figure 3:
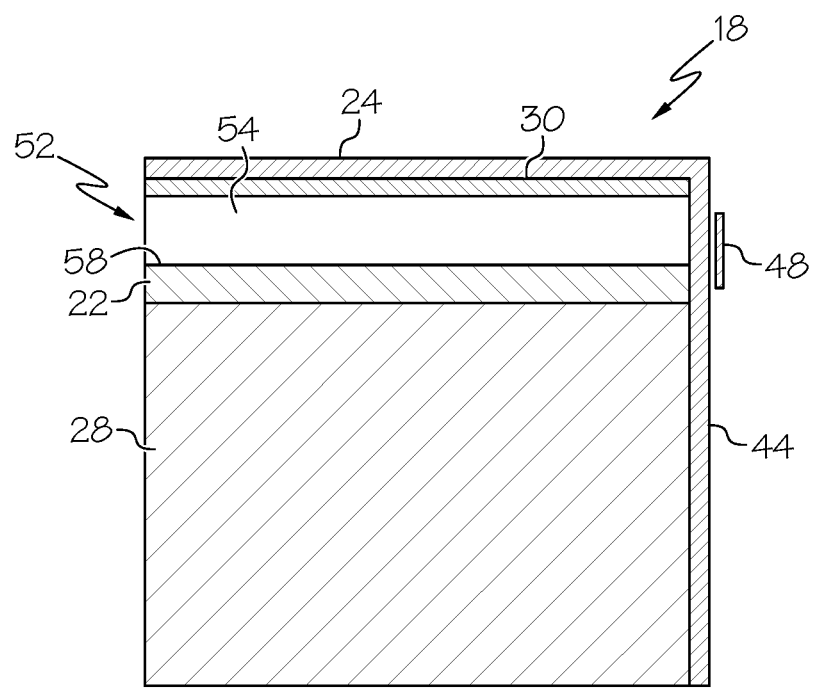
FIG. 3 is a side sectional view of part of the rocket motor of the missile of FIG. 1.

With reference now in addition to FIG. 3, details of the rocket motor 18 are now discussed. The rocket motor 18 includes the casing 24 surrounding a solid rocket fuel (propellant) 28. The casing 24 may have a casing liner 30 on the inside of the casing 24.

The rocket fuel (propellant) 28 may have a suitable shape with a central opening (not shown) where the combustion of the rocket fuel 28 occurs, with combustion spreading radially outward from the central opening. This burning of the solid fuel 28 produces pressurizes gasses, which exit the casing 24 through a nozzle 32 (FIG. 1) at an aft end of the casing 24, producing thrust that propels the missile 10.

The casing 24 may be made of steel or a composite material, and the casing liner 30 may be made of phenolic or a polymeric material. The solid rocket fuel 28 may be of any of a variety of solid fuel materials, for example materials such as ammonium perchlorate.

The energetic material 22 is located inside the casing 24, between the solid fuel 28 and the casing 24. The energetic material 22 may be located inside of the casing liner 30. The energetic material 22 may be situated along a surface of the casing liner 30. Suitable energetic materials include hexanitrostilbene (HNS), or a polymer-based explosive such as PBXN-5. More broadly, energetic materials allowed per RCC-319 may be used, such as Comp A3, Comp A4, Comp A5, Comp CH6, DIPAM, HNS Type 1 or Type 2 Gr A, HNS-IV, LX-14, PBX 9407, PBXN-5, PBXN-6, PBXN-7, PBXN-9, PBXN-11, PBXN-12, or PBXN-301.

The energetic material 22 may extend along an axial direction of the rocket motor 18. The energetic material 22 may extend aftward from a forward bulkhead 44 of the casing 24. The energetic material 22 may extend afterward over part or all of the length of the rocket motor 18. An initiator 48 for the energetic material 22 may be located on the bulkhead. The initiator 48 may be an exploding foil initiator that includes a thin conductive foil that is heated and vaporized by application of an electric current. The vaporization of the metal foil accelerates a flyer, such as made of steel or aluminum, and causes the flyer to impact the bulkhead 44. The shock from the impact of the flyer on the bulkhead 44 traverses the bulkhead 44 to detonate the energetic material 22.

Other types of detonators or initiators for the energetic material 22 are possible. For example, a detonator may also be placed directly against the bulkhead 44 to rely on strictly shock transfer through the bulkhead 40 to initiate detonation of the energetic material 22.

Figure 4:
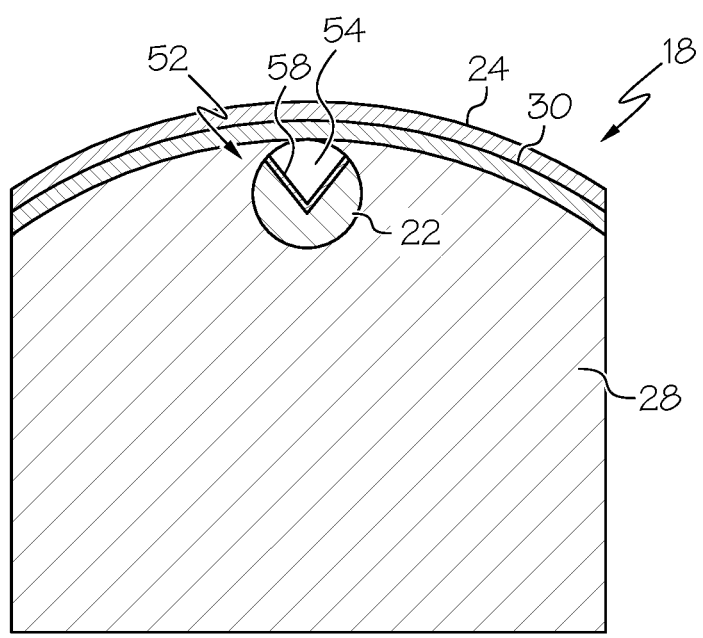
FIG. 4 is an end sectional view of part of the rocket motor of FIG. 3.

Referring now in addition to FIG. 4, the energetic material 22 may be configured as a linear shaped charge 52, to direct (focus) the force of the detonation of the energetic material 22 radially outward to split (rupture) the casing 24. To that end, the energetic material 22 has a wedge-shape opening (void) 54, in which the energetic material 22 does not extend. A charge liner 58 is on a surface of the energetic material 22 that adjoins the wedge-shaped opening 54. The charge liner 58 may be a metal material such as aluminum, or a plastic material, such as high density poly ethylene (HDPE) or hydroxyl-terminated polybutadiene (HTPB).

Detonation of the energetic material 22 proceeds aft from the bulkhead 44. The shape of the energetic material 22 concentrates explosive energy in the void 54. This drives the charge liner 58 into the void 54, making the charge liner 58 into a jet that drives into and through the casing 24. This causes a bulge in and eventually rupture of the casing 24.

Figure 5:
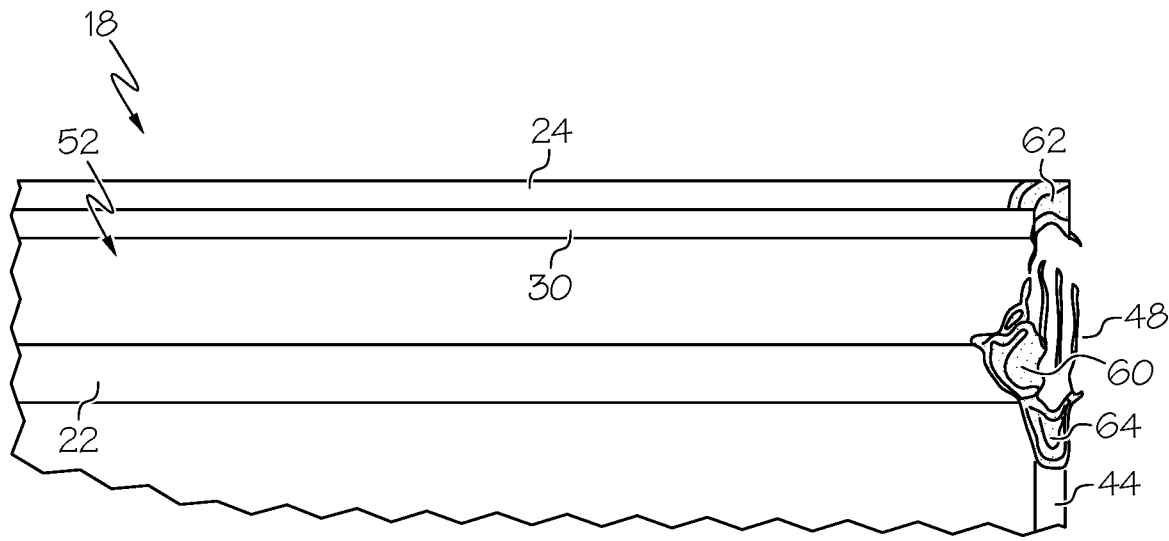
FIG. 5 is a side sectional view of the rocket motor of FIG. 3, as a first time in the process of detonation of the energetic material.

FIGS. 5-10 illustrate the process of rupturing the casing 24 using the linear shaped charge 52. FIG. 5 illustrates the condition just after initiation of the detonation of the energetic material 22 by the initiator 48. The region where the detonation is felt is indicated by reference number 60. Shock from the collision of the flyer with the bulkhead 44 also propagates upward through the bulkhead 44 to the casing 24, as shown at 62, as well as downward through the bulkhead, at 64.

Figure 6:
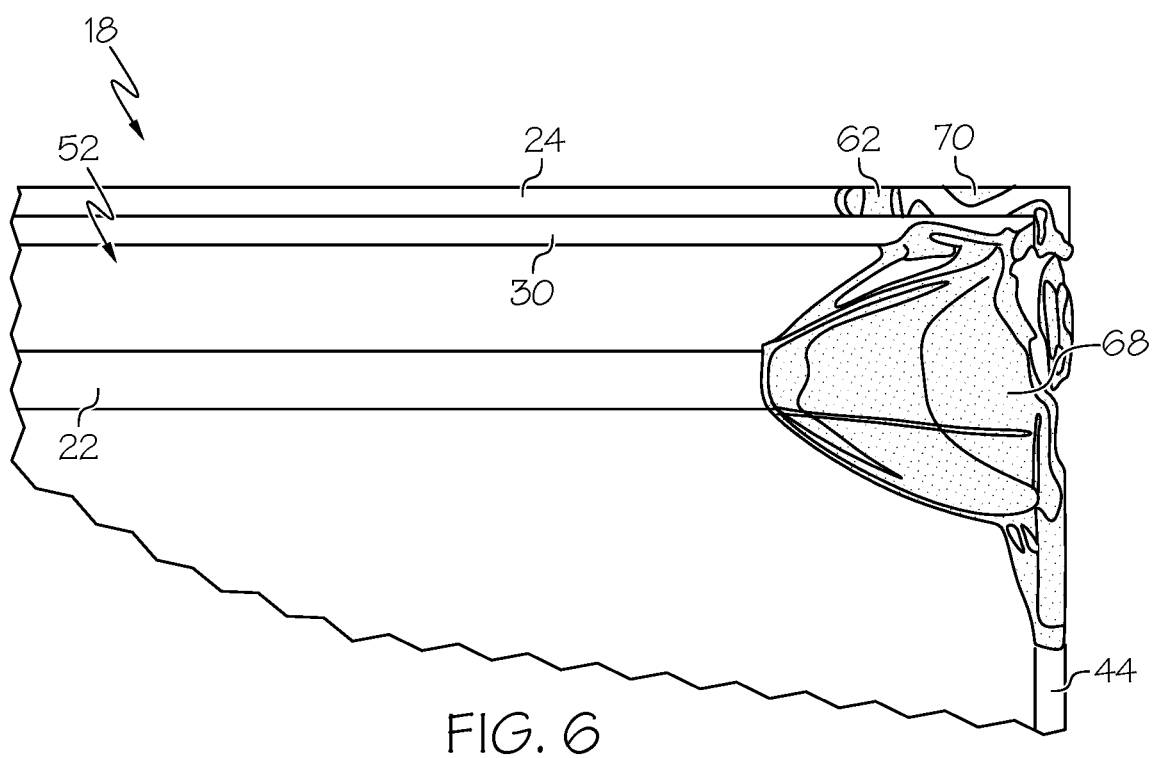
FIG. 6 is a side sectional view of the rocket motor of FIG. 3, as a second time in the process of detonation of the energetic material.

FIG. 6 shows a later time, with the detonation of the energetic material 22 propagating in an axial direction away from the bulkhead 44, in a detonation region 68. Near the bulkhead 44 the material from the charge liner 58 has moved upward from the force of the detonation of the underlying energetic material 22, nearly reaching the casing 24. The upward initiation shock 62 has progressed in an axial direction past a casing portion 70 where the material from the detonation of the linear shaped charge 52 is about to reach the casing 24.

Figure 7:
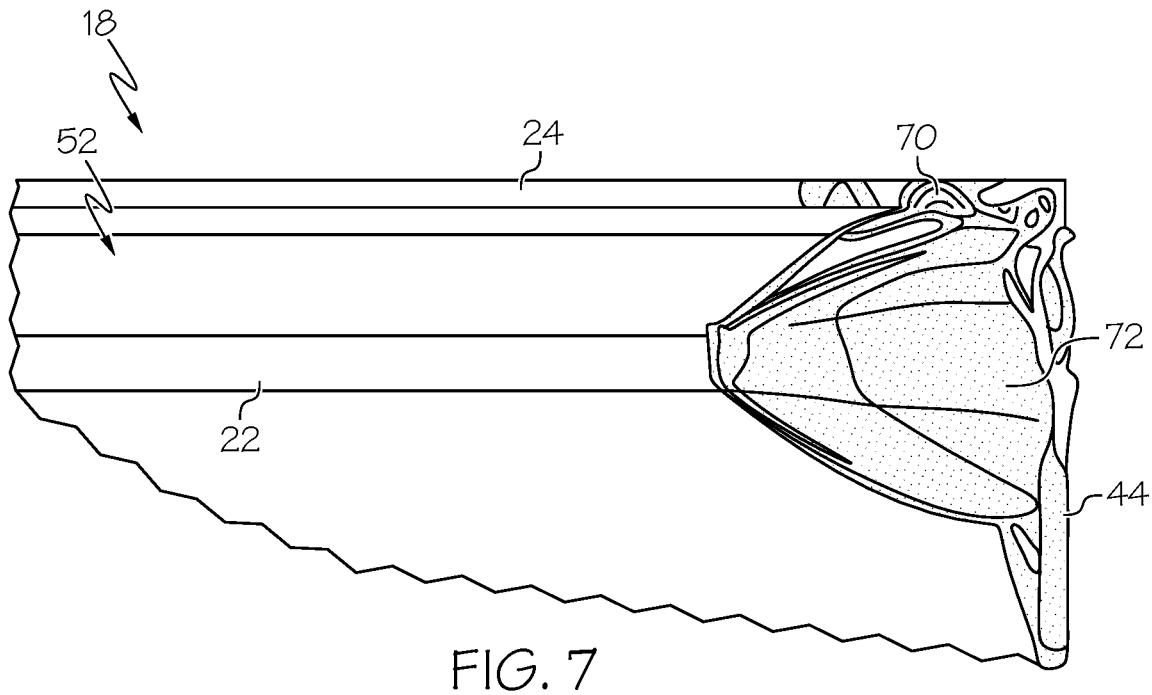
FIG. 7 is a side sectional view of the rocket motor of FIG. 3, as a third time in the process of detonation of the energetic material.

FIG. 7 shows the increased stress in the casing portion 70 of the casing 24 where the initial rupture will occur, at the edge of a detonation region 72. The detonation of the energetic material 22 of the linear shaped charge 52 has also caused deformation of the bulkhead 44.

Figure 8:
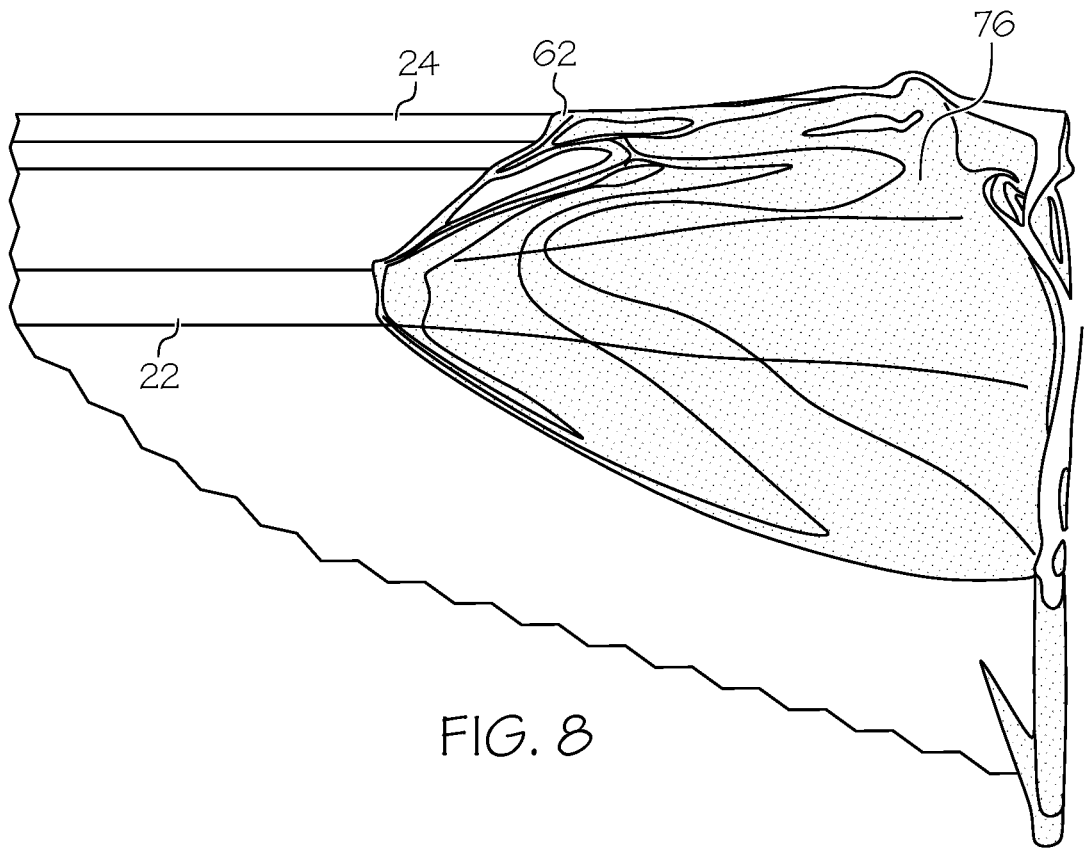
FIG. 8 is a side sectional view of the rocket motor of FIG. 3, as a fourth time in the process of detonation of the energetic material.
Figure 9:
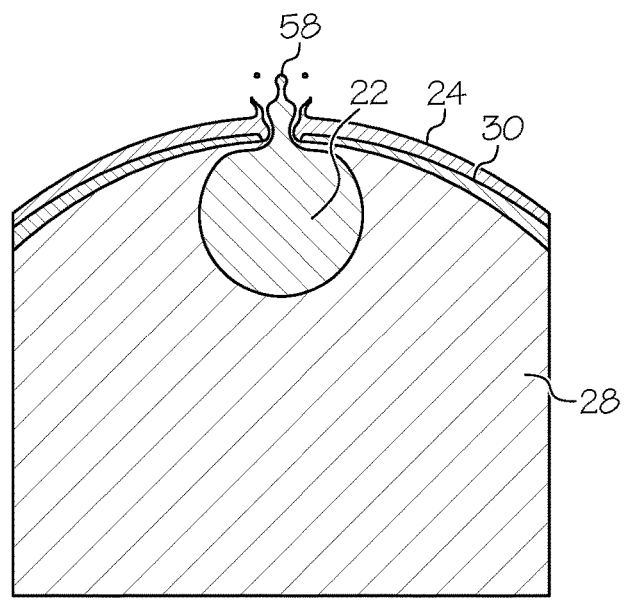
FIG. 9 is an end sectional view of the rocket motor of FIG. 3, at the fourth time illustrated in FIG. 8.

FIG. 8 shows the situation with rupture of the casing 24 having begun, with a detonation region 76 extending through the casing 24. The detonation of the energetic material 22 continues in an axial direction (leftward in the figure), with the stress in the casing 24 having caught up with the upward initiation shock 62 which has continued propagation along the casing 24 in the same axial direction. An end sectional view of this condition is shown in FIG. 9.

Figure 10:
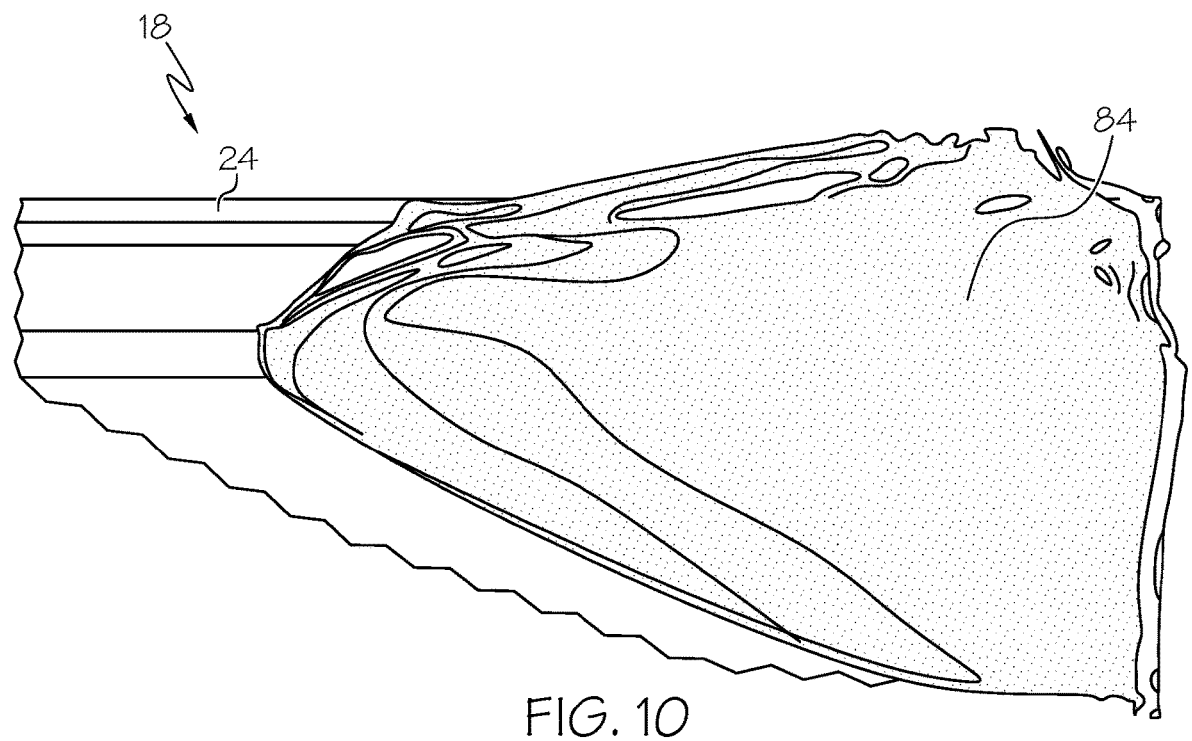
FIG. 10 is a side sectional view of the rocket motor of FIG. 3, as a fifth time in the process of detonation of the energetic material.

FIG. 10 shows the situation at a further time in the process, with the rupture of the casing 24 increasing in an axial direction, the same direction in which the energetic material 22 continues the process of detonation, in a detonation region 84. The rupture of the casing 24 prevents the rocket motor 18 (FIG. 1) from operating to produce thrust.

The rupture of the casing 24 may also cause rupture of the storage canister 20 (FIG. 2), if the missile 10 (FIG. 1) is stored in the canister 20 at the time of detonation of the energetic material 22. This allows release of pressure from materials escaping from the casing 24.

When the rocket motor 18 operates normally to produce thrust by burning of the propellant 14, the energetic material 22 is not explosively detonated by the combustion. Instead, the energetic material is also burned in the combustion process, and adds to the thrust produced by the rocket motor 18. The use of the energetic material 22 to provide thrust advantageously provides for more efficient use of the weight of the rocket motor 18. Unlike prior configurations where an energetic material is used solely for rupture of a casing, the energetic material 22 here provides an additional function of being configured to produce thrust during normal operation of the rocket motor 18.

The rocket motor 18 advantageously has the energetic material 22 within the casing 24. This avoids detrimental effects on aerodynamics of the missile 10 (FIG. 1) that may result from having the termination devices outside of a casing.

The initiator 48 may be activated automatically upon the occurrence of one or more circumstances. For example the initiator 48 may be configured to initiate detonation of the energetic material 22 (and the linear shaped charge 52) when a certain temperature or range of temperatures is reached. The temperature for triggering the initiator 48 may be the temperature of the initiator 48 itself. Alternatively or in addition there may be one or more temperature sensors, placed in appropriate places in the missile 10 and/or the container 20, that may be used for determining when to activate the initiator 48.

The circumstances for triggering the initiator 48 may include non-temperature-related circumstances. This may be done to terminate the flight upon completion of the test shot or erratic flight, so that the shot does not leave a test range. For example the initiator 48 may be triggered by a determination of some flight condition, such as erratic maneuvering, exhaustion of fuel, or exceeding a predetermined time after launch. The components such as the energetic material 22 and the initiator may be components of a flight termination system (FTS).

Alternatively or in addition, the initiator 48 may be actively triggered, for example by receiving a signal from a remote operator. A remote operator may send such a signal (for example) to terminate flight of the missile for one or more reasons, with the signal sent by radio to the missile 10, and forwarded within the missile 10 to the initiator 48, to detonate the energetic material 22 and terminate flight.

FIG. 11 shows a high-level flow chart of a method 100 of rupturing the casing 24 (FIG. 1) using the linear shaped charge 52 (FIG. 3). In step 102 the initiator 48 (FIG. 3) is triggered. As described above, the triggering of the initiator 48 may be automatic, upon the occurrence of one or more predetermined circumstances, or may be active, such as being controlled by an external operator.

In step 104 the burnable energetic material 22 (FIG. 3) is detonated, which activates the linear shaped charge 52 (FIG. 3), which is internal to the casing 24 (FIG. 3). Finally in step 106 the linear shaped charge 52 ruptures the casing 24 from within. As discussed above, this rupturing may occur axially along the casing 24, rupturing the casing 24 outward. This may serve as a flight termination, or may disable the rocket motor 18 when the missile 10 is on the ground or in storage, and is exposed to heat, such as from a fire.

FIG. 12 shows a high-level flow chart of a method 150 of operating the missile 10. In step 152 the energetic material 22 (FIG. 1) is consumed. This may be accomplished in one (or both) of two different modes, in respective steps 154 and 156. In the first mode 154 the energetic material 22 is burned along with the propellent 28 (FIG. 3), in normal (thrust-producing) operation of the rocket motor 18 (FIG. 1). In the second mode 156 the energetic material 22 is detonated to rupture (split) the casing 24 (FIG. 1) of the rocket motor 18.

FIG. 13 shows a rocket motor 218 that has an alternative configuration, with an energetic material 222 separated from a solid rocket fuel (propellant) 228 by an insulative material 226. The energetic material 222 and a charge liner 258 together constitute a linear shaped charge 252 which is used to rupture a casing 224, in a manner similar to that of the rocket motor 18 (FIG. 1), as described above.

The insulative material 226 may function to prevent inadvertent detonation of the solid fuel 228 by detonated energetic material 222. The insulative material 226 may be a burnable material, that burns during normal operation of the rocket motor 218, along with the burnable energetic material 222 and solid fuel 228. An example of a suitable material for the insulative material 226 is high density poly ethylene (HDPE) or hydroxyl-terminated polybutadiene (HTPB).

Although the disclosure has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the disclosure. In addition, while a particular feature of the disclosure may have been described above with respect to only one or more of several illustrated embodiments, such feature may be combined with one or more other features of the other embodiments, as may be desired and advantageous for any given or particular application.

What is claimed is:

1. A rocket motor comprising:
   a casing;
   a solid propellent; and
   an energetic material between the solid propellent and the casing;
   wherein the energetic material is configured to burn along with the solid propellent to produce thrust in the rocket motor;
   wherein the energetic material is configured to be capable of detonation to rupture the casing; and
   wherein the energetic material is part of a linear shaped charge.

2. The rocket motor of claim 1, wherein the linear shaped charge includes a charge liner on a surface of the energetic material.

3. The rocket motor of claim 2,
   wherein the charge liner is on a surface of a void in the energetic material; and
   wherein the charge liner faces radially outward toward the casing.

4. The rocket motor of claim 3, wherein the void is a wedge-shaped void.

5. The rocket motor of claim 1, further comprising a casing liner between the casing, and the solid propellant and the energetic material.

6. The rocket motor of claim 1, wherein the energetic material is in contact with the solid propellent.

7. A rocket motor comprising:
   a casing;
   a solid propellent; and
   an energetic material between the solid propellent and the casing;
   wherein the energetic material is configured to burn along with the solid propellent to produce thrust in the rocket motor;
   wherein the energetic material is configured to be capable of detonation to rupture the casing; and
   wherein the energetic material includes hexanitrostilbene (HNS) or a polymer-based explosive.

8. A rocket motor comprising:
   a casing;
   a solid propellent; and
   an energetic material between the solid propellent and the casing;
   wherein the energetic material is configured to burn along with the solid propellent to produce thrust in the rocket motor;
   wherein the energetic material is configured to be capable of detonation to rupture the casing; and
   further comprising an insulative material between the solid propellent and the energetic material.

9. The rocket motor of claim 8, wherein the insulative material is a burnable material.

10. The rocket motor of claim 8, wherein the insulative material acts a barrier to prevent ignition of the solid propellent from the energetic material.

11. A rocket motor comprising:
    a casing;
    a solid propellent; and
    an energetic material between the solid propellent and the casing;
    wherein the energetic material is configured to burn along with the solid propellent to produce thrust in the rocket motor;
    wherein the energetic material is configured to be capable of detonation to rupture the casing; and
    further comprising an initiator that is operatively coupled to the energetic material to detonate the energetic material.

12. The rocket motor of claim 11, wherein the initiator is separated from the energetic material by a bulkhead that is part of the casing.

13. The rocket motor of claim 11, wherein the initiator is configured to trigger detonation of the energetic material upon occurrence of one or more circumstances.

14. The rocket motor of claim 13, wherein the one or more circumstances includes a temperature-related circumstance.

15. The rocket motor of claim 13, wherein the one or more circumstances includes a flight-related circumstance.

16. The rocket motor of claim 11, wherein the initiator is actively triggerable by a remote operator.

17. The rocket motor of claim 11, wherein the rocket motor is part of a missile.

18. The rocket motor of claim 11, further comprising a casing liner between the casing, and the solid propellent and the energetic material.

19. The rocket motor of claim 11, wherein the energetic material is in contact with the solid propellent.

20. A missile comprising:
    a rocket motor that includes:
    a casing; and
    a solid propellent; and
    an energetic material inside the casing;
    wherein the energetic material burns along with the solid propellent during normal operation of the rocket motor; and
    wherein the energetic material is part of a linear shaped charge capable of rupturing the casing.

* * * * *